United States Patent [19]

Patriarca

[11] Patent Number: 4,502,811
[45] Date of Patent: Mar. 5, 1985

[54] ADJUSTABLE SUPPORTS FOR CYCLE SADDLES

[76] Inventor: Jean Patriarca, 50 Cours Vitton, Lyon 69006, France

[21] Appl. No.: 474,646
[22] PCT Filed: Dec. 30, 1981
[86] PCT No.: PCT/FR81/00174
§ 371 Date: Feb. 28, 1983
§ 102(e) Date: Feb. 28, 1983
[87] PCT Pub. No.: WO83/02260
PCT Pub. Date: Jul. 7, 1983

[51] Int. Cl.³ .............................................. B25G 3/36
[52] U.S. Cl. ..................................... 403/391; 297/195
[58] Field of Search ..................... 403/389, 390, 391; 297/195

[56] References Cited

U.S. PATENT DOCUMENTS 4,142,813 3/1979 Laborde ............................. 403/391

FOREIGN PATENT DOCUMENTS 845990 5/1939 France ................................. 403/390

Primary Examiner—Andrew V. Kundrat
Attorney, Agent, or Firm—Dowell & Dowell

[57] ABSTRACT

A support for mounting a cycle saddle on a frame pillar including a shoe member fixed to the pillar and extending longitudinally from the pillar and having a convex upper face; a carriage having a mating lower concave face and having two flanges depending therefrom and overlying the side faces of the shoe, the carriage having longitudinal depressions in its upper face for receiving the saddle frame wires and having a central rectangular opening extending transversely through the depressions; a head having a base portion entering the opening and having clamping portions extending laterally of the head and aligning with the depressions in the carriage and having depressions therein to receive the saddle frame wires; and a bolt transfixing the shoe and the carriage and the head through a longitudinal slot in the shoe.

1 Claim, 3 Drawing Figures

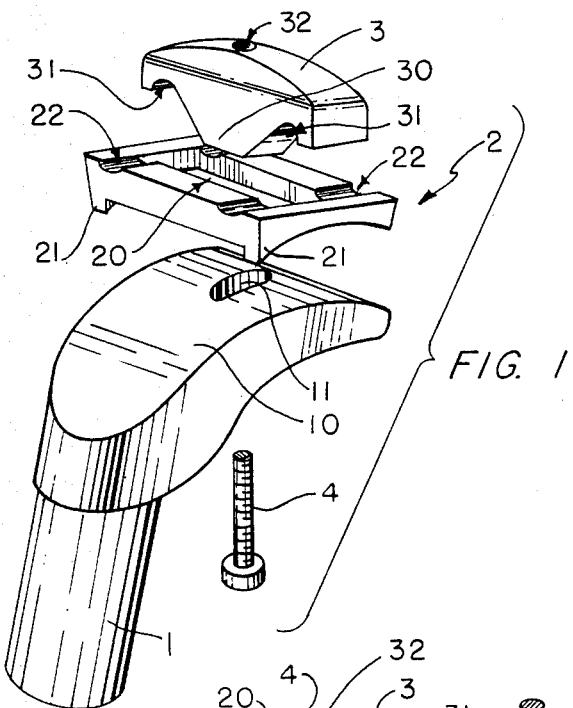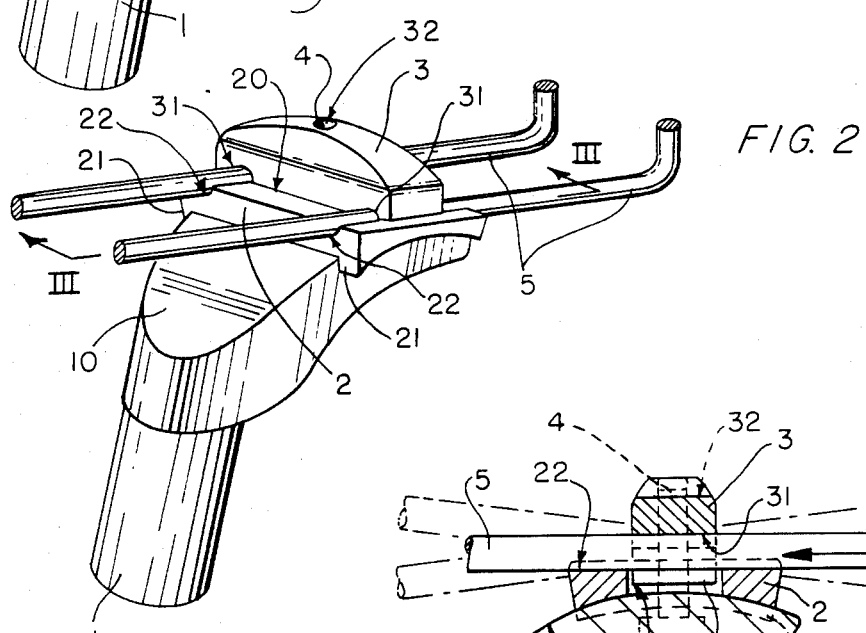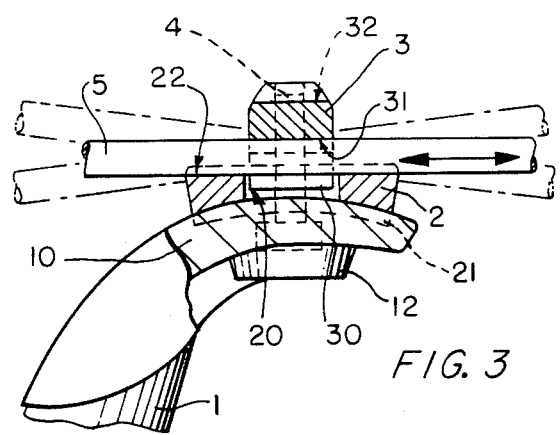

ADJUSTABLE SUPPORTS FOR CYCLE SADDLES

The present invention relates to devices known in the cycle industry under the name of "saddle pillars" and intended to form supports for the lower frame of saddles of bicycles, mopeds and like vehicles, with a view to allowing adjustment in angular orientation and in axial position with respect to the upper part of the frame.

It is known that it has recently been proposed to replace the conventional systems incorporating flanges and annular jaws by more elaborate devices, having improved aesthetic appearance and further allowing much simpler use. However, these devices, which most often employ members adapted to move angularly over a part of concave or convex cross section supported by the top of the saddle pillar, are of complex and therefore expensive construction and generally comprise a relatively high number of constituent parts which complicates assembly operations.

The more particular purpose of the improvements forming the subject matter of the present invention is to overcome the above drawbacks and to allow an orientable support or saddle pillar to be produced which is capable of responding particularly well to the various requirements of the art.

The invention consists essentially of providing the upper part of the saddle pillar with a curved section in the form of a shoe with upwardly turned convexity of mounting on this shoe a carriage element provided with impressions which, in cooperation with corresponding impressions provided on an upper head, form jaws for gripping the base of the frame of the saddle, and of ensuring retention of said carriage element and the bringing together of the said jaws with the aid of a single screw which passes through the shoe through an elongated slot and which screws in a topped hole in the afore-mentioned head.

The accompanying drawing, given by way of example, will enable the invention, the characteristics that it presents, the advantages that it is capable of procuring, to be more readily understood.

FIG. 1 is an exploded view in perspective showing, prior to their assembly, the different members constituting a saddle support according to the invention.

FIG. 2 reproduces FIG. 1 after assembly of the members and positioning of the lower part of the frame of a conventional saddle.

FIG. 3 is a schematic vertical section along the plane indicated at III—III in FIG. 2.

In this drawing, reference 1 denotes the upper part of the pillar adapted to be connected to the frame of the cycle in order to ensure adjustable fixation of the saddle. In known manner, the top of the tube 1 presents a shoe 10 of curved section in the form of a butt with upwardly turned convexity. It should be observed that the central part of the shoe or butt 10 has a slot 11 cut therein, which extends longitudinally along the axis of said shoe.

The support according to the invention further comprises a carriage element 2 having a wide central opening 20 made therein. The longitudinal edges of this carriage 2 extend downwardly in order to determine lateral guides or flanges 21 which ensure centring of the whole of the carriage element on the shoe or butt 10. Opposite these flanges 21, the carriage element 2 has longitudinal depressions 22, aligned in two's, hollowed therein.

With the carriage element 2 is associated a head profiled so as to engage by its base 30 in the opening 20 in said carriage element. The head 3 presents two clamping portions having depressions 31 which open downwardly to cooperate with the depressions 22 afore-mentioned; moreover, it is provided with a vertical tapped hole 32 in order to receive an assembly screw 4, adapted to be engaged from the bottom to pass through the slot 11.

The whole of the arrangement of the support or "saddle pillar" according to the invention will be seen on examining FIG. 1. In FIG. 2, it has been assumed that the assembly screw 4 has been positioned and that the two parallel rods 5 which constitute the base of a saddle of conventional type have been engaged between the jaws formed by the opposite depressions 22 and 31.

It will be appreciated that by turning the screw 4 (of which the head is advantageously housed inside the boss referenced 12 in FIG. 3 and provided on the lower face of the shoe or butt 10), these jaws are tightened. Prior to the forceful tightening of the screw 4, the operator may slide the rods 5 axially forwards or backwards to adjust the longitudinal position of the saddle on the frame of the cycle; furthermore, the carriage element 2 itself is capable of being displaced over the shoe 10, allowing the inclination of the saddle to be adjusted, the flanges 21 ensuring centring of said carriage element during the operation.

It will be noted that the whole of the support is of very reduced dimensions and has a sober and aesthetic appearance. The number of parts is limited and assembly of these parts as well as adjustment of the saddle may be effected very simply.

It must, moreover, be understood that the foregoing description has been given only by way of example and that it in no way limits the domain of the invention, replacement of the details of execution described by any other equivalents not departing from the scope thereof.

I claim:

1. An adjustable support for supporting on a frame pillar of a cycle a saddle of the type having parallel longitudinally disposed frame wires, the support comprising:
   (a) a shoe supported on the pillar and having a convex longitudinally extending upper face comprising transversely extending generatrices, the upper face being bounded by two parallel lateral faces of the shoe, and the shoe having a longitudinally elongated slot extending vertically through its upper face;
   (b) a carriage having an upper face having spaced parallel longitudinally extending depressions disposed and shaped to receive said saddle frame wires and having a lower concave face shaped to mate with said convex upper face of the shoe, and the carriage having laterally spaced flanges extending downwardly below said concave face and disposed to overlie the parallel lateral faces of the shoe to align the carriage therewith, the flanges extending longitudinally the full length of the concave lower face, and the carriage having a central rectangular opening extending therethrough between the upper and lower faces, the rectangular opening extending in the lateral direction to intersect both of said depressions;

(c) a head having a base portion shaped to enter said rectangular opening and having clamping portions extending laterally from the head and aligning with said depressions and shaped to engage the saddle frame wires where they cross said rectangular opening, and the head having a central vertically disposed threaded hole extending therethrough; and (d) a screw extending through said slot in the shoe and engaging said threaded hole to tighten the head and carriage on the saddle frame wires and hold the carriage against the shoe.